(12) United States Patent
Makino et al.

(10) Patent No.: US 9,322,349 B2
(45) Date of Patent: Apr. 26, 2016

(54) INTERNAL COMBUSTION ENGINE CONTROL APPARATUS

(71) Applicant: Mitsubishi Electric Corporation, Chiyoda-ku, Tokyo (JP)

(72) Inventors: Tomokazu Makino, Chiyoda-ku (JP); Hideki Hagari, Chiyoda-ku (JP); Takuo Watanuki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 143 days.

(21) Appl. No.: 14/185,481

(22) Filed: Feb. 20, 2014

(65) Prior Publication Data

US 2015/0114367 A1    Apr. 30, 2015

(30) Foreign Application Priority Data

Oct. 24, 2013  (JP) .................................. 2013-220836

(51) Int. Cl.
*F02M 1/00*  (2006.01)
*F02D 41/00*  (2006.01)
(Continued)

(52) U.S. Cl.
CPC ............ *F02D 41/0072* (2013.01); *F02D 41/18* (2013.01); *F02D 13/0215* (2013.01); *F02D 2200/0402* (2013.01);
(Continued)

(58) Field of Classification Search
CPC ............ F02D 35/0023; F02D 35/0046; F02D 35/023; F02D 35/025
USPC .......... 701/103, 108; 123/434, 435, 673, 674, 123/690, 568.19, 568.25, 568.11
See application file for complete search history.

(56) References Cited

U.S. PATENT DOCUMENTS 6,199,537 B1    3/2001    Kowatari et al.
6,279,551 B1 *  8/2001    Iwano ..................... F02B 37/18
                                                    123/564
(Continued)

FOREIGN PATENT DOCUMENTS

JP          5133282 A      5/1993
JP        200097086 A      4/2000
(Continued)

OTHER PUBLICATIONS

Communication dated Oct. 28, 2014 from The Japanese Patent Office in counterpart Japanese Patent Application No. 2013-220836.

*Primary Examiner* — John Kwon
(74) *Attorney, Agent, or Firm* — Sughrue Mion, PLLC; Richard C. Turner (57) ABSTRACT

There is provided an internal combustion engine control apparatus that can more accurately calculate a volume efficiency correction coefficient and can more accurately estimate the amount of air that flows into a cylinder and the external exhaust gas recirculation amount. In an internal combustion engine provided with an exhaust gas recirculation apparatus including an exhaust gas recirculation valve and an exhaust gas recirculation path, based on a cylinder flow rate, an exhaust gas recirculation amount, an inner-intake-pipe density, and an inner-intake-pipe density changing amount, a volume efficiency correction coefficient, as a volume efficiency corresponding value, is calculated; then, by use of the calculated volume efficiency correction coefficient, a cylinder intake air amount and a recirculation amount of exhaust gas that is taken into the cylinder are calculated.

9 Claims, 6 Drawing Sheets

(51) Int. Cl.
*F02D 41/18* (2006.01)
*F02M 25/07* (2006.01)
*F02D 13/02* (2006.01)

(52) U.S. Cl.
CPC ............. *F02D 2200/0406* (2013.01); *F02D 2200/0411* (2013.01); *F02M 25/0756* (2013.01); *Y02T 10/47* (2013.01)

(56) References Cited

U.S. PATENT DOCUMENTS

| | | | |
|---|---|---|---|
| 2001/0017126 A1 | 8/2001 | Kowatari et al. | |
| 2002/0129790 A1 | 9/2002 | Kowatari et al. | |
| 2003/0075147 A1 | 4/2003 | Kowatari et al. | |
| 2005/0066937 A1* | 3/2005 | Toyoshima ........... | F02D 11/105 123/339.25 |
| 2007/0293956 A1* | 12/2007 | Yasui .................. | F01L 13/0021 700/29 |
| 2008/0115762 A1* | 5/2008 | Hiraku ................. | F02D 13/08 123/339.14 |
| 2008/0127938 A1 | 6/2008 | Hagari | |
| 2011/0126812 A1* | 6/2011 | Miyashita ............ | F01N 13/107 123/703 |
| 2013/0032101 A1* | 2/2013 | Takeuchi .............. | F01P 7/164 123/41.02 |
| 2013/0239669 A1 | 9/2013 | Hagari et al. | |
| 2015/0113983 A1* | 4/2015 | Yokono ................ | F02B 37/18 60/605.1 |
| 2015/0240731 A1* | 8/2015 | Yokono ................ | F02D 41/0007 60/611 |

FOREIGN PATENT DOCUMENTS

| | | |
|---|---|---|
| JP | 2008138630 A | 6/2008 |
| JP | 2013-194587 A | 9/2013 |

* cited by examiner

| | Segr | |
|---|---|---|
| Est | 10% | 5 |
| | 20% | 10 |
| | 30% | 15 |
| | 40% | 20 |
| | 60% | 25 |
| | 80% | 40 |
| | 100% | 50 |

FIG. 7

INTERNAL COMBUSTION ENGINE CONTROL APPARATUS

BACKGROUND OF THE INVENTION

1. Field of the Invention

The present invention relates to an internal combustion engine control apparatus and more particularly to an internal combustion engine control apparatus for accurately calculating a cylinder intake air amount and a cylinder intake exhaust gas recirculation amount.

2. Description of the Related Art

In order to appropriately control an internal combustion engine (although also referred to as an engine, referred to as an internal combustion engine in the following explanation), it is important to accurately calculate the amount of air taken into a cylinder and to perform fuel control and ignition timing control in accordance with the amount of air taken into the cylinder flow. With regard to fuel control, when feedback control can be performed in such a way that, primarily, a fuel, the amount of which causes a desired air-fuel ratio for a cylinder intake air amount, is injected, almost excellent controllability can be obtained; however, ignition timing control needs to be performed at an ignition advance angle which causes an maximum output (referred to as an MBT (Minimum Spark Advance for Best Torque), hereinafter) in accordance with not only the rotation speed of the internal combustion engine and the cylinder intake air flow rate but also other factors such as the temperature of the internal combustion engine, whether or not a knock has occurred, the fuel property, and the EGR ratio, which is the ratio of EGR (Exhaust Gas Recirculation) flow rate to the intake air amount. Among the foregoing factors that provide effects to the MBT, for example, the internal combustion engine temperature and whether or not a knock has occurred can be detected by an internal combustion engine temperature sensor and a knock sensor, respectively; the fuel property, i.e., whether the fuel is regular gasoline or high-octane gasoline can be determined based on whether or not a knock has occurred.

Meanwhile, with regard to the EGR ratio, there are two methods, i.e., a method (referred to as an external EGR, hereinafter) in which an EGR valve is provided in an EGR path that connects the exhaust pipe with the intake pipe and the EGR flow rate is controlled based on the opening degree of the EGR valve and a method (referred to as an internal EGR) in which a variable valve timing mechanism (referred to as a VVT (Variable Valve Timing), hereinafter), which makes the opening/closing timings of an intake valve and an exhaust valve variable, is provided and depending on the opening/closing timings thereof, an overlap period, during which the intake valve and the exhaust valve are concurrently opened, is changed so that the EGR flow rate, which is caused by remaining exhaust gas in the cylinder, is controlled; in some cases, both the methods are concurrently utilized. With regard to the external EGR ratio, the EGR flow rate can approximately be calculated based on the opening degree of the EGR valve, the exhaust gas pressure, and the inner-intake-pipe pressure.

In an internal combustion engine having the foregoing intake/exhaust VVT that can vary the valve opening/closing timings of the intake valve and the exhaust valve, the amount of air that is taken into the cylinder through the intake manifold largely changes depending on the valve timing; therefore, when the effect of the valve timing is not taken into consideration, the accuracy of calculating the amount of air taken into the cylinder may be deteriorated. Furthermore, in recent years, it has become common that control of an internal combustion engine is performed utilizing, as an index, the output torque of the internal combustion engine; even when the output torque is estimated, the thermal efficiency changes in accordance with the cylinder intake air amount and the EGR ratio. Accordingly, in order to calculate the foregoing MBT and furthermore in order to estimate the torque and the thermal efficiency, it is required to accurately calculate the cylinder intake air amount and the EGR ratio.

Thus, Patent Document 1 discloses a technology for accurately calculating a cylinder intake air amount even in an internal combustion engine having such an intake/exhaust VVT. Patent Document 1 discloses a method of calculating a volume efficiency corresponding value, which is an index indicating the amount of air taken into a cylinder through the intake manifold, based on two internal variants, which are referred to as an intake efficiency and an exhaust efficiency, with regard to a method of estimating a cylinder intake air amount, based on the volume efficiency corresponding value and a physical model in which the response delay of the intake system in an interval during which air passes through the throttle valve and enters the cylinder is modeled.

PRIOR ART REFERENCE

Patent Document

[Patent Document 1] Japanese Patent Application Laid-Open No. 2013-194587

However, no EGR flow rate is taken into consideration in the method disclosed in Patent Document 1; thus, there has been a problem that when an external EGR is introduced into the intake manifold, the actual volume efficiency coefficient changes and hence the calculated cylinder intake air amount differs from the amount of actual intake air. Similarly, no volume-efficiency change of the EGR flow rate is taken into consideration; thus, there has also been a problem that the calculated cylinder intake air amount differs from the flow rate of the external EGR that is actually taken into the cylinder.

SUMMARY OF THE INVENTION

The present invention has been implemented in order to solve the foregoing problems; the objective thereof is to provide an internal combustion engine control apparatus that can more accurately calculate a volume efficiency correction coefficient and can more accurately estimate the amount of air that flows into a cylinder and the external EGR flow rate.

An internal combustion engine control apparatus according to the present invention includes an intake air amount detection unit that detects an amount of air that passes through a throttle valve provided in an intake pipe of an internal combustion engine and is taken into the internal combustion engine, a volume efficiency corresponding value calculation unit that calculates a volume efficiency corresponding value as an index that indicates an amount of air that flows from the intake pipe at the downstream side of the throttle valve into a cylinder of the internal combustion engine, a physical model in which an intake-system response delay in an interval from a time point when air passes through the throttle valve to a time point when the air enters the cylinder is modeled, an exhaust gas recirculation path that connects an intake pipe at the downstream side of the throttle valve with an exhaust pipe, an exhaust gas recirculation valve that opens or closes the exhaust gas recirculation path so as to control a recirculation amount of exhaust gas, an exhaust gas recirculation amount calculation unit that calculates the recirculation amount of exhaust gas that passes through the exhaust gas recirculation path and is taken into the intake pipe, and an inner-intake-pipe density detection unit that can detect a density in the intake pipe at the downstream side of the throttle valve and a density change in the intake pipe, as an inner-intake-pipe density and an inner-intake-pipe density changing amount; the internal combustion engine control apparatus is characterized in that the volume efficiency corresponding value is calculated based on the intake air amount, the exhaust gas recirculation amount, the inner-intake-pipe density, and the inner-intake-pipe density changing amount, and in that the amount of air that is actually taken into the cylinder and the recirculation amount of exhaust gas that is actually taken into the cylinder are estimated based on the intake air amount, the volume efficiency corresponding value, and the physical model.

In the internal combustion engine control apparatus according to the present invention, an external exhaust gas recirculation flow rate is taken into consideration in a physical model in which a response delay in the intake system is modeled, so that the amount of air that is taken into the cylinder can accurately be calculated; furthermore, the volume efficiency corresponding value utilized in this physical model is calculated based on the intake air amount, the inner-intake-pipe density, and the inner-intake-pipe density changing amount, so that the amount of air that is taken into the cylinder can be calculated in real time and in an accurate manner. As a result, it is made possible to estimate the amount of air that is actually taken into the cylinder and the recirculation amount of exhaust gas that is actually taken into the cylinder.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
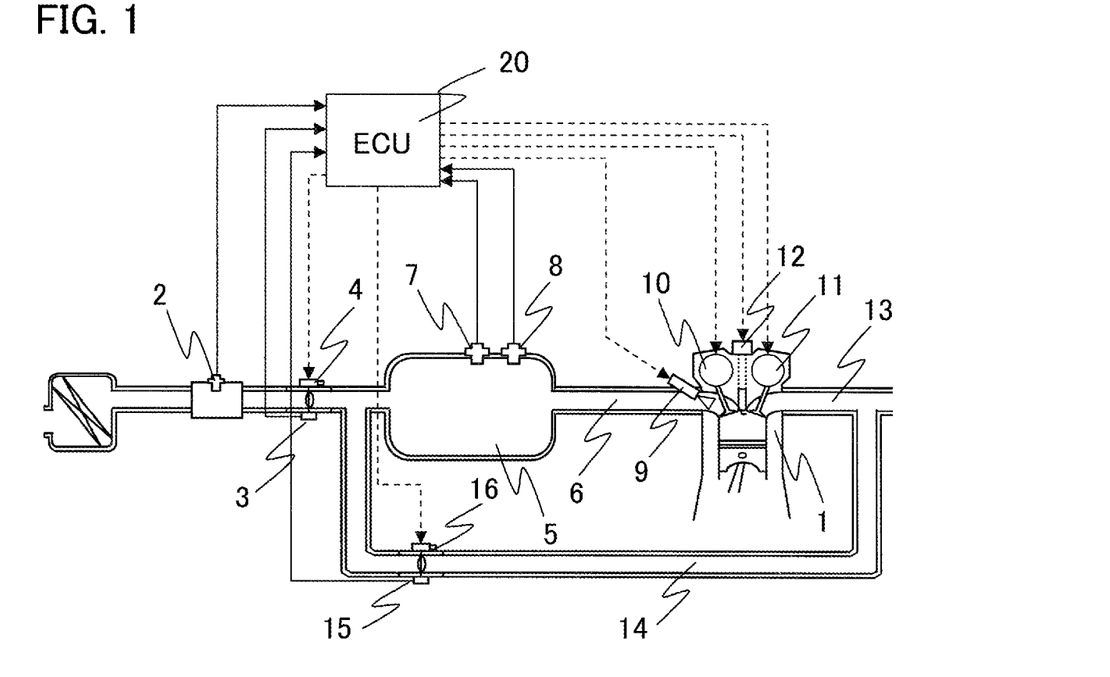
FIG. 1 is a configuration diagram schematically illustrating an internal combustion engine to which an internal combustion engine control apparatus according to Embodiment 1 of the present invention is applied.

Hereinafter, an internal combustion engine control apparatus according to Embodiment 1 of the present invention will be explained in detail with reference to the drawings. FIG. 1 is a configuration diagram schematically illustrating an internal combustion engine to which the internal combustion engine control apparatus according to Embodiment 1 of the present invention is applied. In FIG. 1, an air flow sensor (referred to as an AFS, hereinafter) 2 that measures an intake air amount is provided at the upstream side of the intake system of an internal combustion engine 1. At the downstream side of the AFS 2, an electronically-controlled throttle 4 that can electrically be controlled to adjust the intake air amount is provided. In order to measure the opening degree of the electronically-controlled throttle valve 4, a throttle opening degree sensor 3 is provided. It may be allowed that instead of the AFS 2, another unit is utilized that measures an intake air amount, for example, in such a manner as to estimate the intake air amount based on the throttle valve opening degree.

Furthermore, there are provided an intake manifold pressure sensor 7 that measures the pressure (hereinafter, referred to as an intake manifold pressure) in a space (referred to as an intake manifold, hereinafter) including a surge tank 5 and an intake manifold 6 provided at the downstream side of the throttle 4 and an intake air temperature sensor 8 that measures the temperature inside the intake manifold (referred to as an intake manifold temperature, hereinafter). It may also be allowed that instead of providing the intake air temperature sensor 8 that measures an intake manifold temperature, a temperature sensor, such as a temperature sensor included in the AFS 2, that approximately measures the outer air is utilized and the intake manifold temperature is estimated based on the temperature of the outer air, although strictly speaking, the estimated temperature differs from the temperature measured by use of the intake air temperature sensor 8.

An injector 9 for injecting a fuel is provided in the vicinity of the intake valve including the intake manifold 6 and the inside of the cylinder of the internal combustion engine 1; an intake VVT (VVT: Variable Valve Timing) 10 and an exhaust VVT for changing the valve timing are provided in the intake valve and the exhaust valve, respectively; an ignition coil 12 for driving an ignition plug that produces a spark in a cylinder is provided on the cylinder head. A catalyst and an $O_2$ sensor, which are unillustrated, are provided in an exhaust manifold 13.

An exhaust gas recirculation path (referred to as an EGR path, hereinafter) 14 connects the exhaust manifold 13 with the surge tank 5. An exhaust gas recirculation valve (referred to as an EGR valve, hereinafter) 16 for controlling an exhaust gas recirculation amount (referred to as an EGR flow rate, hereinafter) is provided in the EGR path 14; in order to measure the opening degree of the EGR valve 16, an EGR valve opening degree sensor 15 is provided therein.

Figure 2:
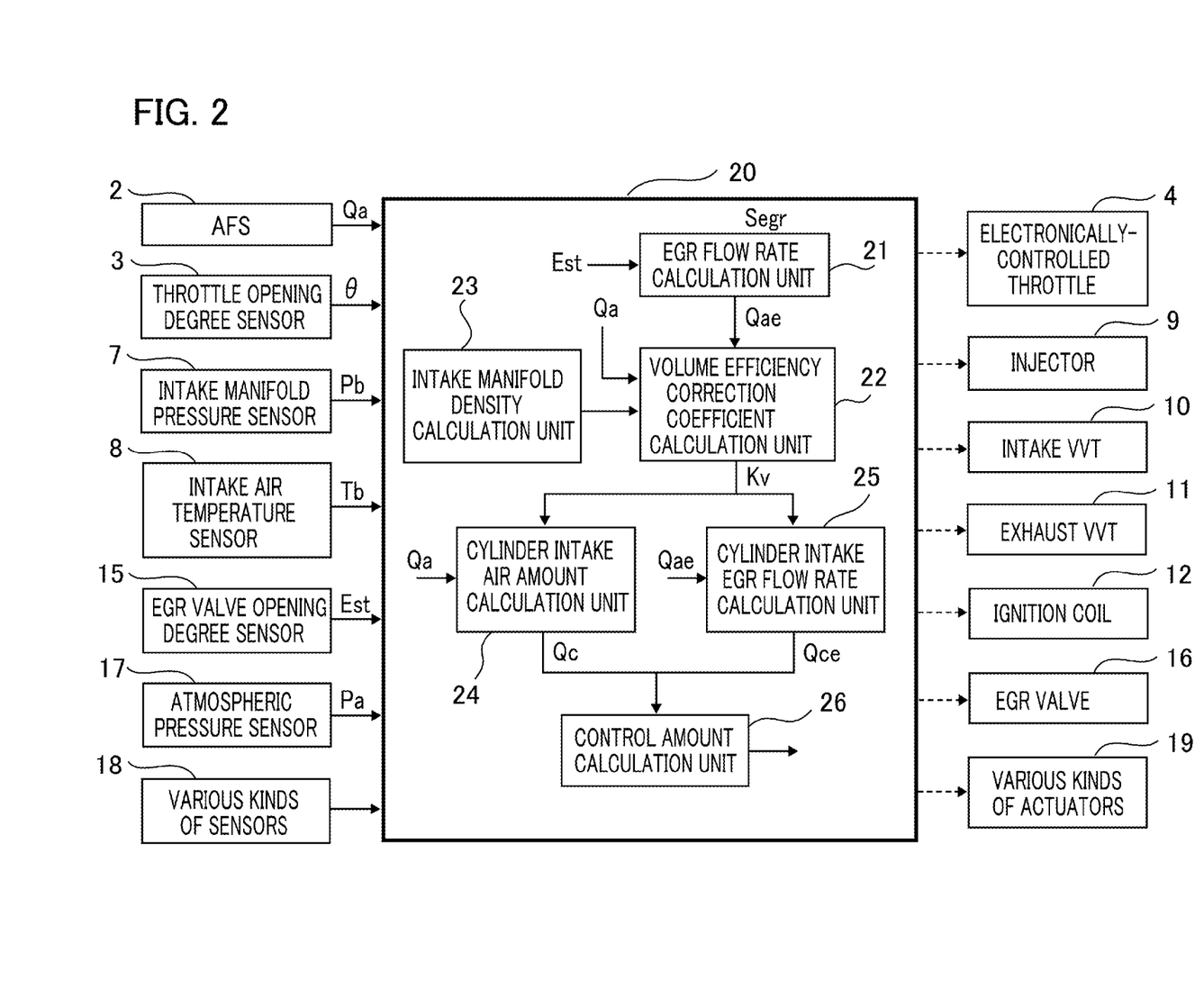
FIG. 2 is a block diagram illustrating an internal combustion engine control apparatus according to Embodiment 1 of the present invention.

FIG. 2 is a block diagram illustrating an internal combustion engine control apparatus according to Embodiment 1 of the present invention. In FIG. 2, an intake air amount Qa measured by the AFS 2, an opening degree θ of the electronically-controlled throttle 4 measured by the throttle opening degree sensor 3, an intake manifold pressure Pb measured by the intake manifold pressure sensor 7, an intake manifold temperature Tb measured by the intake air temperature sensor 8, an opening degree Est of the EGR valve 16 measured by the EGR valve opening degree sensor 15, and an atmospheric pressure Pa measured by an atmospheric pressure sensor 17 are inputted to an electronic control unit (referred to as an ECU (Electric Control Unit), hereinafter) 20.

Instead of the atmospheric pressure sensor 17 for measuring an atmospheric pressure, either a unit for estimating the atmospheric pressure or an atmospheric pressure sensor incorporated in the ECU 20 may be utilized. Measurement values are also inputted to the ECU 20 from various sensors (including an accelerator opening degree sensor and a crank angle sensor, which are unillustrated).

The ECU 20 is provided with an EGR flow rate calculation unit 21, a volume efficiency correction coefficient calculation unit 22 as a volume efficiency corresponding value calculation unit, an intake manifold density calculation unit 23, a cylinder intake air amount calculation unit 24, a cylinder intake EGR flow rate calculation unit 25, and a control amount calculation unit 26. The EGR flow rate calculation unit 21 calculates the EGR flow rate Qae based on the EGR valve opening degree Est. Next, the volume efficiency correction coefficient calculation unit 22 calculates a volume efficiency correction coefficient Kv based on the intake air amount Qa measured by the AFS 2, the EGR flow rate Qae, and an intake manifold density ρb calculated by the intake manifold density calculation unit 23. The cylinder intake air amount calculation unit 24 calculates a cylinder intake air amount Qc, based on the foregoing calculated volume efficiency correction coefficient Kv and the intake air amount Qa.

The cylinder intake EGR flow rate calculation unit 25 calculates a cylinder intake EGR flow rate Qce, based on the volume efficiency correction coefficient Kv and the EGR flow rate Qae. Based on the cylinder intake air amount Qc and the cylinder intake EGR flow rate Qce, the control amount calculation unit 26 calculates a control amount for driving the injector 9, the ignition coil 12, and the like and drives the injector 9, the ignition coil 12, and the like. The ECU 20 calculates a desired torque of the internal combustion engine 1, based on various kinds of inputted data items such as the accelerator opening degree and the like, calculates a desired cylinder intake air flow rate for achieving the calculated desired torque, calculates a desired throttle valve opening degree, a desired intake VVT phase angle, and a desired exhaust VVT phase angle so that the desired cylinder intake air flow rate is achieved, and controls the opening degree of the electronically-controlled throttle 4 and the respective phase angles of the intake VVT 10 and the exhaust VVT 11 by utilizing these calculated values as desired values. Other various kinds of actuators are also controlled, as may be necessary.

Next, an intake-system physical model for calculating the cylinder intake air amount from an intake air amount measured by the AFS 2 will be explained in detail, in the case where in FIG. 1, the cylinder intake air amount calculation unit 24, i.e., the EGR valve 16 is opened and hence the exhaust manifold 13 and the surge tank 5 are connected with each other through the EGR path 14.

Here, the following definitions will be made ((n): the number of strokes).

Qa(n): the one-stroke average value of an intake air amount calculated by the AFS 2

Qae(n): the one-stroke average value of an EGR flow rate [g/s] calculated based on the EGR valve opening area Qc(n): the one-stroke average value of a cylinder intake air flow rate[g/s]

Qce(n): the one-stroke average value of a cylinder intake EGR flow rate [g/s]

T(n): one stroke (in the case of a four-cylinder internal combustion engine, the time corresponding to 180[degCA]; in the case of a three-cylinder internal combustion engine, the time corresponding to 240[degCA])

Vs: the volume [cm$^3$] of an intake pipe between the throttle and the inlet of each cylinder Vegr: the volume [cm$^3$] of an intake pipe between the EGR valve and the inlet of each cylinder Vc: the cylinder-stroke volume [cm$^3$] per cylinder ρb(n): the one-stroke average value of an intake manifold air density[g/cm$^3$]

Kv(n): a volume efficiency correction coefficient as the volume efficiency corresponding value of air that enters the cylinder from the intake manifold Kvegr(n): a volume efficiency correction coefficient of EGR that enters the cylinder from the intake manifold When attention is paid only to air (referred to as new air, hereinafter) that passes through the throttle and enters the intake manifold and the mass conservation law in one stroke of an internal combustion engine is applied to the region indicated by the intake-pipe volume Vs[cm$^3$] between the throttle and the inlet of each cylinder, the equation (1) below is given.

$$Qa(n)T(n) - Qc(n)T(n) = \{\rho_b(n-1)\} \cdot Vs \qquad (1)$$

Next, the one-stroke cylinder intake amount is given by the equation (2) below by use of the volume efficiency correction coefficient Kv(n) of the EGR that enters the cylinder from the intake manifold.

$$Qc(n)T(n) = Kv(n) \cdot \rho_b(n) \cdot Vc \qquad (2)$$

In the steady-operation mode, Qa(n)T(n) becomes equal to Qc(n)T(n); therefore, through an equation obtained by replacing the left-hand side of the equation (2) by Qa(n)T(n), the volume efficiency correction coefficient Kv can be calculated when matching of internal combustion engine control constants is made.

Next, the equation (2) is substituted for the equation (1) so as to eliminate ρb(n); then, Qc(n)T(n) is given by the equation (3) below.

$$Qc(n)T(n) = \qquad (3)$$
$$\frac{Kv(n)}{Kv(n-1)} \cdot K \cdot Qc(n-1)T(n-1) + (1-K) \cdot Qa(n)T(n) \because K = $$
$$\frac{Vs}{Vs + Kv(n) \cdot Vc}$$

where K is a filter constant.

Through the equation (3), the cylinder intake air amount Qc(n)T(n) can accurately be calculated from the intake air amount Qa(n)T(n) that is theoretically measured by the AFS 2; the filling efficiency is calculated from the cylinder intake air amount Qc(n)T(n), and then the filling efficiency can be utilized in controlling each of various kinds of internal combustion engines.

In this situation, by further modifying the equation (3), the equation (4) below can be obtained.

$$\frac{Qc(n)T(n)}{Kv(n)} = K \cdot \frac{Qc(n-1)T(n-1)}{Kv(n-1)} + (1-K) \cdot \frac{Qa(n)T(n)}{Kv(n)} \qquad (4)$$

The fact that equation (4) denotes a digital lowpass filter, for example, for interruption processing, performed every predetermined crank angle, that is synchronized with the rotation of an internal combustion engine shows that the intake system of the internal combustion engine is a first order lag element.

In the foregoing equation (3), the throttle valve is replaced by the EGR valve, Qa(n) is replaced by Qae(n), Qc(n) is replaced by Qce(n), and Vs is replaced by Vegr; then, similarly, the equation (5) below is given.

$$Qce(n)T(n) = \tag{5}$$
$$\frac{Kv(n)}{Kv(n-1)} \cdot Kegr \cdot Qce(n-1)T(n-1) + (1-Kegr) \cdot Qae(n)T(n) \because$$
$$Kegr = \frac{Vegr}{Vegr + Kv(n) \cdot Vc}$$

Through the equation (5), the cylinder intake air amount Qc(n)T(n) can accurately be calculated based on the EGR flow rate Qae(n)T(n) that is theoretically calculated from the EGR opening area; the EGR ratio is calculated from the cylinder intake EGR flow rate Qce(n)T(n) and the cylinder intake air amount Qc(n)T(n), and then the EGR ratio can be utilized in controlling each of various kinds of internal combustion engines. Here, for the sake of simplicity, it may be allowed that the intake-pipe volume Vegr[cm$^3$] between the EGR valve and the inlet of each cylinder is regarded as being the same as the intake-pipe volume Vs[cm$^3$] between the throttle and the inlet of each cylinder. Because the intake-pipe volume Vegr between the EGR valve and the inlet of each cylinder is regarded as being the same as the intake-pipe volume Vs between the throttle and the inlet of each cylinder, the filter constant K at a time when the cylinder intake air amount Qc is calculated can be regarded as being the same as Kegr at a time when the cylinder intake EGR flow rate Qce is calculated.

The calculation according to the equation (6) below is implemented by the cylinder intake EGR flow rate calculation unit 25.

$$Qce(n)T(n) = \tag{6}$$
$$\frac{Kv(n)}{Kv(n-1)} \cdot K \cdot Qce(n-1)T(n-1) + (1-K) \cdot Qae(n)T(n) \because K =$$
$$\frac{Vs}{Vs + Kv(n) \cdot Vc}$$

Figure 3:
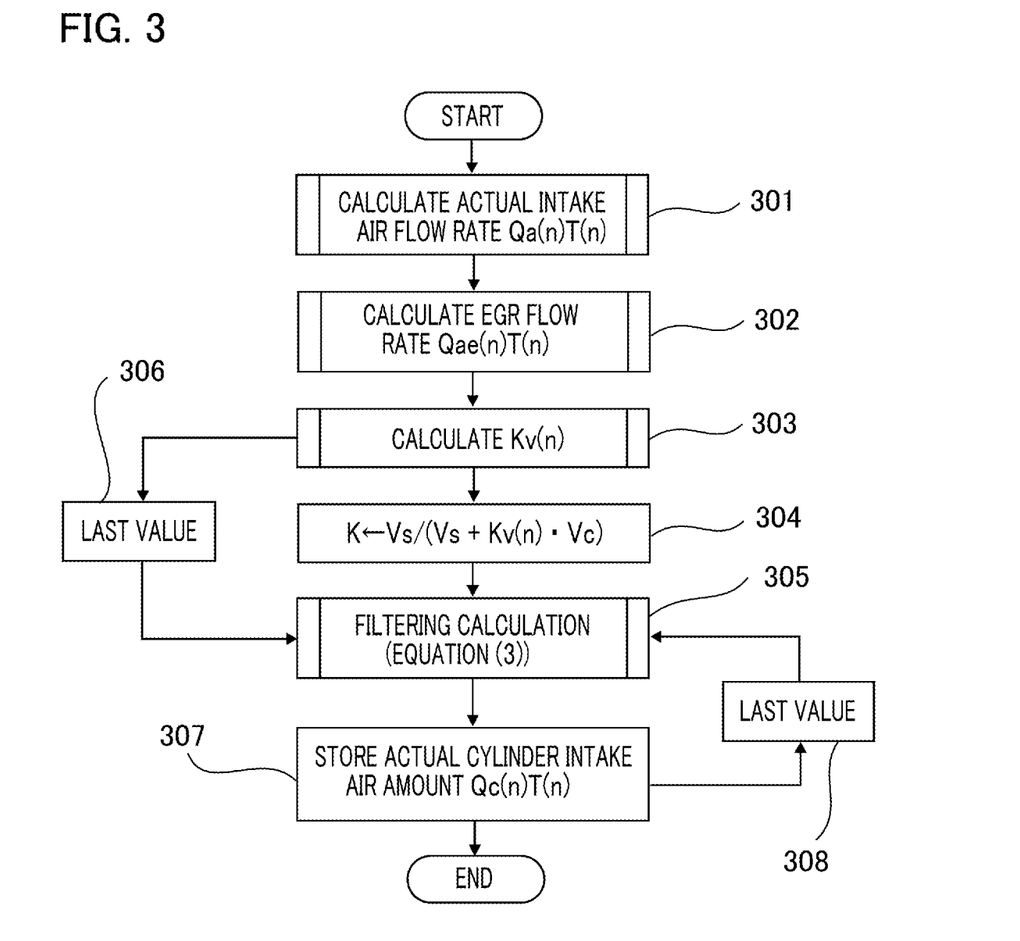
FIG. 3 is a flowchart representing calculation processing for a cylinder intake air amount in an internal combustion engine control apparatus according to Embodiment 1 of the present invention.

Next, there will be explained the method of realizing the foregoing equation (3) in the ECU 20, i.e., the contents of processing in which calculation processing for the cylinder intake air amount, which is performed by the cylinder intake air amount calculation unit 24, is implemented in interruption processing performed every predetermined crank angle (e.g., interruption processing performed every BTDC05[degCA] (B05 processing)). FIG. 3 is a flowchart representing calculation processing for a cylinder intake air amount in the internal combustion engine control apparatus according to Embodiment 1 of the present invention. In FIG. 3, the actual intake air flow rate Qa(n)T(n) in one stroke of the internal combustion engine is calculated in the step 301. This can be realized, for example, in such a manner that when the AFS 2 is a mass flowmeter, the output voltage of the AFS 2 is sampled, for example, every 1.25[ms] and integrated, and the one-stroke actual intake air flow rate Qa(n)T(n)[g] is calculated based on the integration value in the interval from the last interruption processing to the present interruption processing. When the AFS 2 is a volume flowmeter, the one-stroke actual intake air flow rate Qa(n)T(n)[g] can be calculated by converting the volume into the mass, based on the standard atmospheric density, the atmospheric pressure, and the intake air temperature.

Subsequently, in the step 302, the EGR flow rate Qae(n)T(n) is calculated; the step 302 corresponds to the EGR flow rate calculation unit 21 in FIG. 2 and will be described later.

Subsequently, in the step 303, the volume efficiency correction coefficient Kv(n) is calculated; the step 303 corresponds to the volume efficiency correction coefficient calculation unit 22 in FIG. 2, and the detail of the calculation unit for the volume efficiency correction coefficient Kv(n) will be described later. In the step 304, the filter constant K is calculated in accordance with the calculation equation for the filter constant K in the equation (3). In the step 305, the cylinder intake air amount Qc(n)T(n)[g] is calculated in accordance with the filtering-calculation equation in the equation (3); however, the one-stroke-previous volume efficiency correction coefficient Kv(n−1) referred to here is realized in such a manner that the one-stroke-previous volume efficiency correction coefficient Kv(n−1) is preliminarily stored in the step 306 and then is utilized.

In the step 307, the actual cylinder intake air amount Qc(n)T(n)[g] calculated in the step 305 is stored. In the step 308, the one-stroke-previous actual cylinder intake air amount Qc(n−1)T(n−1)[g] to be utilized in the step 305 is preliminarily stored. Such a simple calculation utilizing the volume efficiency correction coefficient Kv(n) makes it possible to accurately calculate the cylinder intake air amount Qc(n)T(n)[g].

Figure 4:
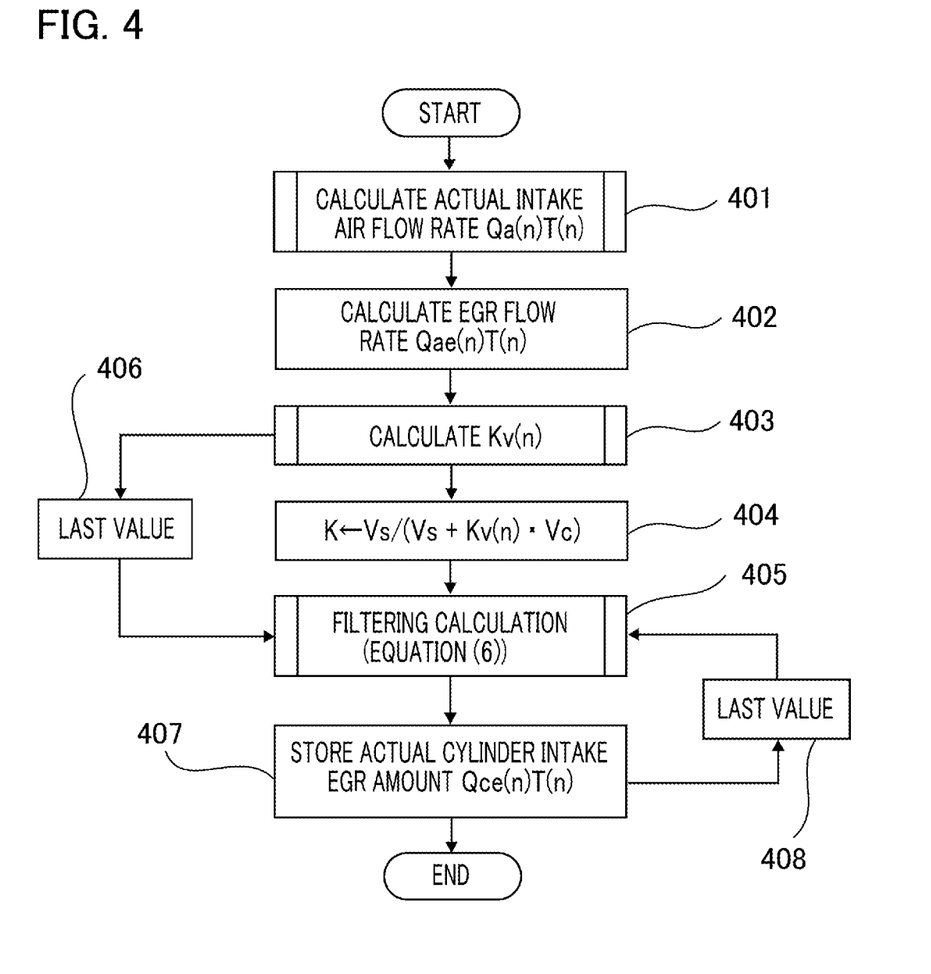
FIG. 4 is a flowchart representing calculation processing for a cylinder EGR flow rate in an internal combustion engine control apparatus according to Embodiment 1 of the present invention.

Next, there will be explained in detail the method of realizing the foregoing equation (6) in the ECU 20, i.e., the contents of processing in which calculation processing for the cylinder EGR flow rate, which is performed by the cylinder intake EGR flow rate calculation unit 25, is implemented in interruption processing performed every predetermined crank angle (e.g., interruption processing performed every BTDC05[degCA] (B05 processing)). FIG. 4 is a flowchart representing calculation processing for a cylinder EGR flow rate in the internal combustion engine control apparatus according to Embodiment 1 of the present invention. In the steps 401 through 404 in the flowchart in FIG. 4, the same processing items as those in the foregoing steps 301 through 304 are performed; therefore, the explanation therefor will be omitted.

In the step 405, the actual cylinder intake EGR flow rate Qce(n)T(n)[g] is calculated in accordance with the filtering-calculation equation in the equation (6); however, the one-stroke-previous volume efficiency correction coefficient Kv(n−1) referred to here is realized in such a manner that the one-stroke-previous volume efficiency correction coefficient Kv(n−1) is preliminarily stored in the step 406 and then is utilized. In the step 407, the actual cylinder intake EGR amount Qce(n)T(n)[g] calculated in the step 405 is stored. In the step 408, the one-stroke-previous actual cylinder intake air amount Qc(n−1)T(n−1)[g] to be utilized in the step 405 is preliminarily stored. Such a simple calculation utilizing the volume efficiency correction coefficient Kv(n) makes it possible to accurately calculate the actual cylinder intake EGR flow rate Qce(n)T(n)[g].

Figure 5:
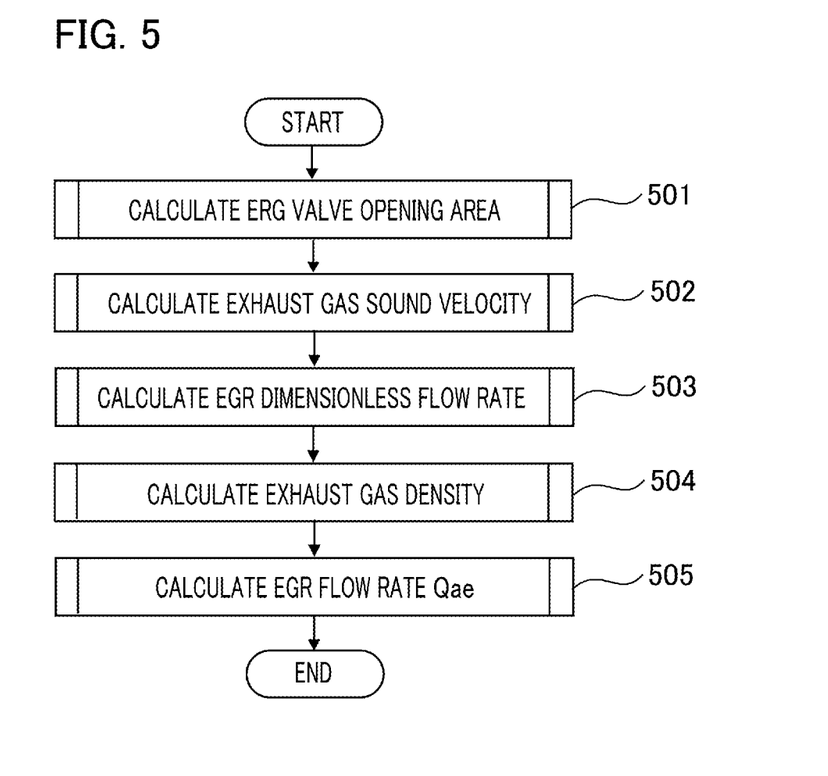
FIG. 5 is a flowchart representing calculation processing for an EGR flow rate in an internal combustion engine control apparatus according to Embodiment 1 of the present invention.
Figure 6:
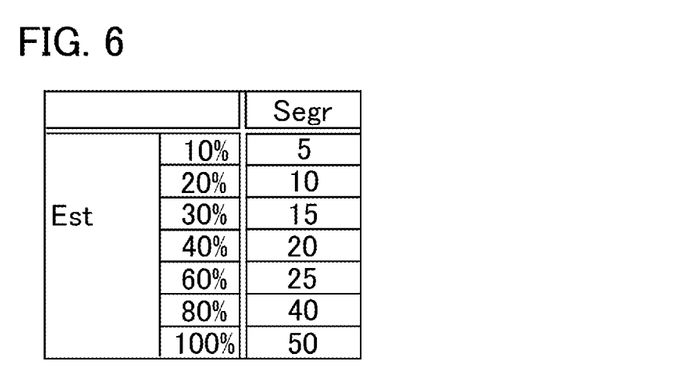
FIG. 6 is a map representing the EGR valve opening degree vs. opening area characteristic utilized in an internal combustion engine control apparatus according to Embodiment 1 of the present invention.

Next, the calculation processing for an EGR flow rate in the EGR flow rate calculation unit 21 in FIG. 2 will be explained. FIG. 5 is a flowchart representing calculation processing for an EGR flow rate in the internal combustion engine control apparatus according to Embodiment 1 of the present invention. In FIG. 5, at first, in the set 501, the EGR valve opening area Segr is obtained based on the EGR valve opening degree Est. For example, an EGR valve opening degree vs. opening area characteristic is prepared. FIG. 6 is a map representing the EGR valve opening degree vs. opening area characteristic to be utilized in the internal combustion engine control apparatus according to Embodiment 1 of the present invention. For example, such a map as represented in FIG. 6 is prepared. Because the opening area is proportional to the flow rate, an EGR valve opening degree vs. flow rate characteristic may also be utilized. In Embodiment 1, the EGR valve opening area Segr corresponding to the EGR valve opening degree Est is calculated from the map represented in FIG. 6.

After that, in the step 502, the exhaust gas sound velocity is calculated. The exhaust gas sound velocity is defined by the equation (7) below.

$$\alpha_e = \sqrt{\kappa \cdot R \cdot Tex} \quad (7)$$

where κ, R, and Tex are the specific heat ratio (1.4, when the gas is air), the gas constant[kJ/(kg·K)], and the inner-exhaust-pipe temperature[K], respectively.

Tex may be measured by a temperature sensor provided in the exhaust pipe or may be calculated from a map including an internal combustion engine rotation speed Ne and an internal combustion engine filling efficiency Ec (calculated from the intake air amount). Because the inner-exhaust-pipe sonic velocity αe is a function of the exhaust gas temperature, it may be allowed that the calculation through the equation (3) is not performed in the ECU 20 and as a map regarding the temperature, results of preliminarily performed calculation are prepared.

Next, in the step 503, an EGR dimensionless flow rate σe is calculated. The EGR dimensionless flow rate σe is defined by the equation (8) below.

$$\sigma_e = \sqrt{\frac{2}{\kappa-1}\left[\left(\frac{Pb}{Pex}\right)^{\frac{2}{\kappa}} - \left(\frac{Pb}{Pex}\right)^{\frac{\kappa+1}{\kappa}}\right]} \quad (8)$$

where κ, Pb, and Pex are the specific heat ratio (1.4, when the gas is air), the intake manifold pressure[kPa], and the inner-exhaust-pipe pressure[kPa], respectively. The inner-exhaust-pipe pressure Pex may be measured by a pressure sensor provided in the exhaust pipe or may be calculated, for example, from a map including the internal combustion engine rotation speed Ne and the internal combustion engine filling efficiency Ec (calculated from the intake air amount). Because the dimensionless flow rate σe is a function of the ratio of the intake manifold pressure Pb to the inner-exhaust-pipe pressure Pex, it may be allowed that the calculation through the equation (8) is not performed in the ECU and as a map regarding the ratio of the intake manifold pressure Pb to the inner-exhaust-pipe pressure Pex, results of preliminarily performed calculation are prepared.

Next, in the step 504, an exhaust gas density ρe is calculated. The exhaust gas density ρe is defined by the equation (9) below.

$$\rho_e = \frac{Pex}{R \cdot Tex} \quad (9)$$

where Pex, R, and Tex are the inner-exhaust-pipe pressure [kPa], the gas constant[kJ/(kg·K)], and the inner-exhaust-pipe temperature, respectively. Tex and Pex are obtained as is the case with the equations (7) and (8), respectively.

Subsequently, in the step 505, the EGR flow rate Qae is calculated. The EGR flow rate Qae is defined by the equation (10) below.

$$Qae = Segr \cdot \alpha_e \cdot \sigma_e \cdot \rho_e \quad (10)$$

where Segr, Qae, αe, σe, and ρe are the EGR valve opening area[mm²], the EGR flow rate[g/s], the inner-exhaust-pipe sonic velocity[m/s], the dimensionless flow rate, and the inner-exhaust-pipe density, respectively.

Thus, the EGR flow rate Qae can be calculated.

Next, the details of the volume efficiency correction coefficient calculation unit 22 illustrated in FIG. 2 will be explained. The equation (3) obtained from the foregoing equations (1) and (2) is an equation for calculating the cylinder intake air amount Qc(n)T(n) from the intake air amount Qa(n)T(n) measured by the AFS 2; when the equation (2) is substituted for the equation (1) so as to eliminate Qc(n)T(n), Kv(n) is given by the equation (11) below.

$$Kv(n) = \frac{Qa(n)T(n) - \{\rho_b(n) - \rho_b(n-1)\} \cdot Vs}{\rho_b(n) \cdot Vc} \quad (11)$$

The intake manifold density ρb(n)[g/cm³] can be calculated through a sate equation expressed by the equation (12) below, by use of the intake manifold pressure Pb(n)[kPa] measured by the intake manifold pressure sensor 7, the intake manifold temperature Tb(n)[K] measured by the intake air temperature sensor 8, and the gas constant R[KJ/(kg·K)].

$$\rho_b(n) = \frac{p_b(n)}{RT_b(n)} \quad (12)$$

The intake manifold density ρb(n) is calculated by the intake manifold density calculation unit 23. By utilizing the equation (12), the inner-intake-pipe density and the inner-intake-pipe density changing amount can readily be calculated based on the inner-intake-pipe pressure and the inner-intake-pipe temperature.

When an external EGR apparatus is connected, the external EGR flow rate is added to the equation (11); thus, the equation (13) below is given.

$$Kv(n) = \frac{\{Qa(n) + Qae(n)\}T(n) - \{\rho_b(n) - \rho_b(n-1)\} \cdot Vs}{\rho_b(n) \cdot Vc}. \quad (13)$$

As described above, through the equation (13), the volume efficiency correction coefficient Kv(n) can be calculated in real time, based on the EGR flow rate Qae and the respective outputs of the AFS 2, the intake manifold pressure sensor 7, and the intake air temperature sensor 8. Because the compositions of air and EGR differ from each other, i.e., strictly speaking, the gas compositions thereof differ from each other, the equation (13) is not established in an accurate sense; however, because the difference between the calculation accuracy at a time when the gas composition is strictly considered and the calculation accuracy at a time when the gas composition is not strictly considered is 2% to 3%, the gas composition will be omitted for the sake of simplicity.

However, in many cases, minute measurement noise intrudes in the outputs of these sensors; therefore, even when the calculation through the equation (3) is performed by use of the volume efficiency correction coefficient Kv(n) calculated through the equation (13), an error may be caused. In this case, it is effective that filtering processing is applied to the volume efficiency correction coefficient Kv(n) calculated through the equation (13) so that noise components are attenuated and then the calculation through the equation (3) is performed by use of the noise-component-attenuated volume efficiency correction coefficient.

Specifically, when it is assumed that Kvf(n) denotes the filtered volume efficiency correction coefficient as a filtered volume efficiency corresponding value, the filter processing can be implemented through the equation (14) below (K1: a filter coefficient; for example, a value of approximately 0.9 to 0.99 is utilized). By implementing the filtering processing, the minute measurement noise in the sensor output value can be suppressed from providing an effect to the volume efficiency correction coefficient.

$$Kvf(n)=K_1 \cdot Kvf(n-1)+(1-K_1) \cdot Kv(n) \qquad (14)$$

In Embodiment 1, as a specific example of method of attenuating noise components, the first-order lowpass-filter processing is cited; however, as an alternative, there may be utilized a volume efficiency correction coefficient obtained by applying a simple moving-average processing to the values in the past several strokes or there may be utilized a volume efficiency correction coefficient obtained, for example, by implementing weighted moving-average processing in which the respective data pieces in the past several strokes are weighted and then are averaged. As the volume efficiency correction coefficient Kv(n) in the equation (3), the filtered volume efficiency correction coefficient Kvf(n) will be utilized.

Figure 7:
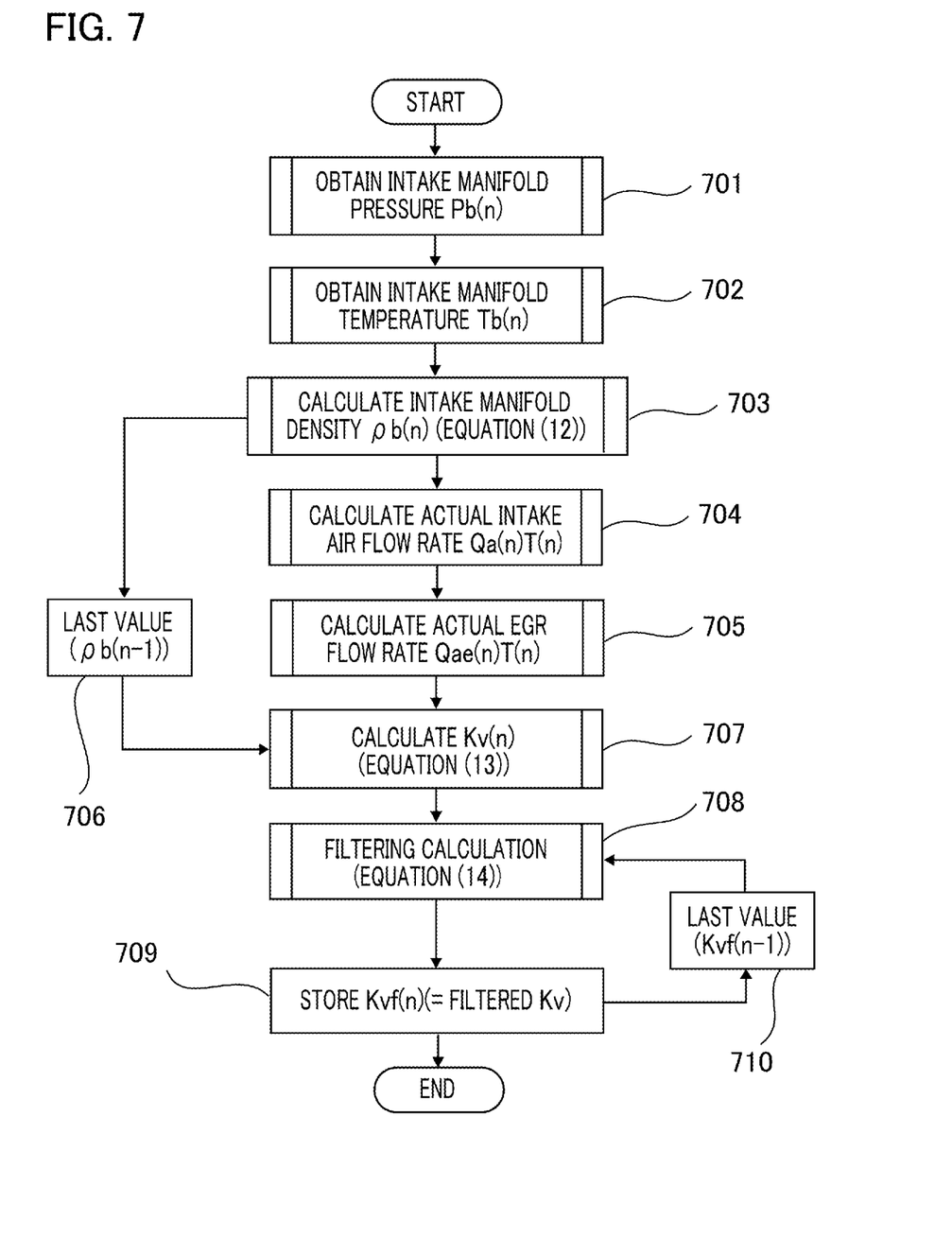
FIG. 7 is a flowchart representing calculation processing for a volume efficiency correction coefficient in an internal combustion engine control apparatus according to Embodiment 1 of the present invention.

Next, there will be explained the method of realizing each of the equations (12) through (14) in the ECU 20, i.e., the contents of processing in which calculation processing for the volume efficiency correction coefficient, which is performed by the volume efficiency correction coefficient calculation unit 22, is implemented in interruption processing performed every predetermined crank angle (e.g., interruption processing performed every BTDC05[degCA] (referred to as B05 processing, hereinafter)). FIG. 7 is a flowchart representing calculation processing for a volume efficiency correction coefficient in the internal combustion engine control apparatus according to Embodiment 1 of the present invention. In FIG. 7, in the step 701, the intake manifold pressure Pb(n) is obtained from the intake manifold pressure sensor 7. Meanwhile, in many cases, the intake manifold pressure vibrates in synchronization with opening/closing of the valve; thus, as is the case with the method in which the actual intake air flow rate Qa(n)T(n)[g] in one stroke is calculated from the output voltage of the AFS 2 in the forgoing step 301, the output voltage of the intake manifold pressure sensor is sampled, for example, every 1.25[ms] and integrated, and the one-stroke intake manifold pressure average value is calculated by dividing the integrated value in the interval from the last interruption processing to the present interruption processing by the integration count; this one-stroke intake manifold pressure average value can also be utilized as the intake manifold pressure Pb(n).

Next, in the step 702, the intake manifold temperature Tb(n) is obtained from the intake air temperature sensor 8. As far as the intake manifold temperature is concerned, as is the case with the intake manifold pressure, a one-stroke average value may be utilized; however, because in general, a temperature sensor is inferior to the pressure sensor in terms of the responsiveness, an instantaneous value may be utilized. In the step 703, the intake manifold density ρb(n) is calculated by use of the foregoing equation (12). Then, in the step 704, the one-stroke actual intake air flow rate Qa(n)T(n)[g] is calculated; for that, the Qa(n)T(n)[g] calculated in the foregoing step 301 may be utilized. Then, in the step 705, the one-stroke EGR flow rate Qae(n)T(n)[g] is calculated; for that, the Qae(n)T(n)[g] calculated in the foregoing step 505 may be utilized. In the step 706, the intake manifold density calculated in the step 703 in the last stroke is preliminarily stored; thus, in the present stroke, the stored intake manifold density can be utilized as the intake manifold density last value ρb(n−1).

Next, in the step 707, by use of the intake manifold density ρb(n) calculated in the step 703, the one-stroke actual intake air flow rate Qa(n)T(n)[g] calculated in the step 704, the one-stroke EGR flow rate Qae(n)T(n)[g] calculated in the step 705, and the intake manifold density last value ρb(n−1) preliminarily stored in the step 706. In the step 708, there is implemented filtering processing for attenuating noise components superimposed on the volume efficiency correction coefficient Kv(n). The filtering processing is the calculation expressed by the equation (14); in this calculation, it is required to utilize Kvf(n−1), which is the last value of the result of the filter processing.

Accordingly, in the step 709, the filtered volume efficiency correction coefficient Kvf(n), which is the result of the filtering processing, is preliminarily stored, and in the step 710, the filtered volume efficiency correction coefficient stored in the step 709 in the last stroke is preliminarily stored; thus, in the present stroke, the stored filtered volume efficiency correction coefficient can be utilized as the filtered volume efficiency correction coefficient last value Kvf(n−1). As described above, the volume efficiency correction coefficient Kv(n) and the filtered volume efficiency correction coefficient Kvf(n) can accurately be calculated by simple calculations, based on the EGR flow rate Qae, and the respective outputs of the AFS 2, the intake manifold pressure sensor 7, and the intake air temperature sensor 8.

As described above, in the internal combustion engine control apparatus according to Embodiment 1 of the present invention, the physical model in which the response delay in the intake system is modeled while the external EGR is taken into consideration and the volume efficiency corresponding value utilized in this physical model are calculated in real time; therefore, there is demonstrated an effect that the cylinder intake air amount and the cylinder intake EGR flow rate can be estimated, without requiring a massive memory capacity, with a few of relevant constants and calculation loads, and with an accuracy enough to appropriately control an internal combustion engine.

Various modifications and alterations of this invention will be apparent to those skilled in the art without departing from the scope and spirit of this invention, and it should be understood that this is not limited to the illustrative embodiments set forth herein.

What is claimed is:
1. An internal combustion engine control apparatus comprising:
an intake air amount detection unit that detects an amount of air that passes through a throttle valve provided in an intake pipe of an internal combustion engine and is taken into the internal combustion engine;
a volume efficiency corresponding value calculation unit that calculates a volume efficiency corresponding value as an index that indicates an amount of air that flows from the intake pipe at the downstream side of the throttle valve into a cylinder of the internal combustion engine;

a physical model in which an intake-system response delay in an interval from a time point when air passes through the throttle valve to a time point when the air enters the cylinder is modeled;

an exhaust gas recirculation path that connects an intake pipe at the downstream side of the throttle valve with an exhaust pipe;

an exhaust gas recirculation valve that opens or closes the exhaust gas recirculation path so as to control a recirculation amount of exhaust gas;

an exhaust gas recirculation amount calculation unit that calculates the recirculation amount of exhaust gas that passes through the exhaust gas recirculation path and is taken into the intake pipe; and an inner-intake-pipe density detection unit that can detect a density in the intake pipe at the downstream side of the throttle valve and a density change in the intake pipe, as an inner-intake-pipe density and an inner-intake-pipe density changing amount, wherein the volume efficiency corresponding value is calculated based on the intake air amount, the exhaust gas recirculation amount, the inner-intake-pipe density, and the inner-intake-pipe density changing amount, and wherein the amount of air that is actually taken into the cylinder and the recirculation amount of exhaust gas that is actually taken into the cylinder are estimated based on the intake air amount, the volume efficiency corresponding value, and the physical model.

2. The internal combustion engine control apparatus according to claim 1, wherein the inner-intake-pipe density detection unit calculates the inner-intake-pipe density and the inner-intake-pipe density changing amount, based on an inner-intake-pipe pressure and an inner-intake-pipe temperature that are detected by a pressure detection unit and a temperature detection unit, respectively, that are provided in the intake pipe at the downstream side of the throttle valve.

3. The internal combustion engine control apparatus according to claim 1, wherein the volume efficiency corresponding value is calculated by use of the equation (15) below.

$$Kv = \frac{Qa + Qae - \Delta \rho_b \cdot Vs}{\rho_b \cdot Vc} \qquad (15)$$

where Kv, Qa, Qae, ρb, Δρb, Vs, and Vc are the volume efficiency corresponding value[ ], the one-stroke intake air amount[g] of the internal combustion engine, the one-stroke EGR flow rate[g] of the internal combustion engine, the inner-intake-pipe density[g/cm³], the inner-intake-pipe density changing amount[g/cm³], the volume[cm³] between the throttle valve and the inlet of the cylinder, and the cylinder stroke volume[cm³] per one cylinder of the internal combustion engine, respectively.

4. The internal combustion engine control apparatus according to claim 2, wherein the volume efficiency corresponding value is calculated by use of the equation (15) below.

$$Kv = \frac{Qa + Qae - \Delta \rho_b \cdot Vs}{\rho_b \cdot Vc} \qquad (15)$$

where Kv, Qa, Qae, ρb, Δρb, Vs, and Vc are the volume efficiency corresponding value[ ], the one-stroke intake air amount[g] of the internal combustion engine, the one-stroke EGR flow rate[g] of the internal combustion engine, the inner-intake-pipe density[g/cm³], the inner-intake-pipe density changing amount[g/cm³], the volume[cm³] between the throttle valve and the inlet of the cylinder, and the cylinder stroke volume[cm³] per one cylinder of the internal combustion engine, respectively.

5. The internal combustion engine control apparatus according to claim 3, wherein as a volume efficiency corresponding value, a filtered volume efficiency corresponding value that is obtained by further applying filtering processing to the volume efficiency corresponding value calculated through the equation (15) is utilized.

6. The internal combustion engine control apparatus according to claim 4, wherein as a volume efficiency corresponding value, a filtered volume efficiency corresponding value that is obtained by further applying filtering processing to the volume efficiency corresponding value calculated through the equation (15) is utilized.

7. The internal combustion engine control apparatus according to claim 1, wherein the amount of air that is taken into the cylinder is calculated by use of the equation (16) below.

$$Qc(n)T(n) = \frac{Kv(n)}{Kv(n-1)} \cdot K \cdot Qc(n-1) \cdot T(n-1) + \\ (1-K) \cdot Qa(n) \cdot T(n) \left( \because K = \frac{Vs}{Vs + Kv(n) \cdot Vc} \right) \qquad (16)$$

where n, Kv(n), Qa, Qc, T(n), Vs, and Vc are the number of strokes of the internal combustion engine, the volume efficiency corresponding value[ ], the one-stroke intake air amount[g/s] of the internal combustion engine, the one-stroke cylinder intake air amount[g/s] of the internal combustion engine, the one-stroke time[s] of the internal combustion engine, the volume[cm³] between the throttle valve and the inlet of the cylinder, and the cylinder stroke volume[cm³] per one cylinder of the internal combustion engine, respectively.

8. The internal combustion engine control apparatus according to claim 1, wherein the recirculation amount of exhaust gas that is taken into the cylinder is calculated by use of the equation (17) below.

$$Qce(n)T(n) = \frac{Kv(n)}{Kv(n-1)} \cdot K \cdot Qce(n-1) \cdot T(n-1) + \\ (1-K) \cdot Qae(n) \cdot T(n) \left( \because K = \frac{Vegr}{Vegr + Kv(n) \cdot Vc} \right) \qquad (17)$$

where n, Kv(n), Qae, Qce, T(n), Vegr, and Vc are the number of strokes of the internal combustion engine, the volume efficiency corresponding value[ ], the one-stroke exhaust gas recirculation amount[g/s] of the internal combustion engine, the one-stroke cylinder intake exhaust gas recirculation amount[g/s] of the internal combustion engine, the one-stroke time[s] of the internal combustion engine, the volume[cm³] between the exhaust gas recirculation valve and the inlet of the cylinder, and the cylinder stroke volume[cm³] per one cylinder of the internal combustion engine, respectively.

9. The internal combustion engine control apparatus according to claim 8, wherein as the volume Vs between the throttle valve and the inlet of the cylinder, the volume Vegr between the exhaust gas recirculation valve and the inlet of the cylinder that is utilized in the equation (17) is adopted.

* * * * *